United States Patent
Lu et al.

(10) Patent No.: US 7,706,485 B2
(45) Date of Patent: Apr. 27, 2010

(54) RADIO INTERFERENCE INDICATOR

(75) Inventors: Tan-Chun Lu, Danshuei Township, Taipei County (TW); Kuen-Ruey Lu, Hsinchu (TW); Wei-Sheng Hsu, Taishan Township, Taipei County (TW); Kung-Wei Tao, Benciao (TW); Bor-Wen Yang, Sijhih (TW)

(73) Assignee: Accton Technology Corporation, Hsinchu (TW)

(*) Notice: Subject to any disclaimer, the term of this patent is extended or adjusted under 35 U.S.C. 154(b) by 1133 days.

(21) Appl. No.: 11/286,400

(22) Filed: Nov. 25, 2005

(65) Prior Publication Data

US 2007/0123169 A1    May 31, 2007

(51) Int. Cl.
*H04B 1/10*  (2006.01)
(52) U.S. Cl. .................. 375/349; 375/346; 375/285
(58) Field of Classification Search .................. 375/349, 375/346, 285
See application file for complete search history.

(56) References Cited

U.S. PATENT DOCUMENTS

| | | | | |
|---|---|---|---|---|
| 5,216,492 | A  * | 6/1993 | Dorrough et al. | 348/185 |
| 5,719,534 | A  * | 2/1998 | Imura | 331/186 |
| 6,141,357 | A  * | 10/2000 | Testani et al. | 370/507 |
| 6,266,330 | B1 * | 7/2001 | Jokinen et al. | 370/329 |
| 7,024,162 | B2 * | 4/2006 | Muthuswamy et al. | 455/67.11 |
| 7,286,971 | B2 * | 10/2007 | Rappaport et al. | 703/2 |
| 7,369,510 | B1 * | 5/2008 | Wong et al. | 370/252 |
| 2005/0003827 | A1 * | 1/2005 | Whelan | 455/454 |
| 2005/0130598 | A1 * | 6/2005 | Dowling | 455/67.11 |

* cited by examiner

*Primary Examiner*—Ted M Wang
(74) *Attorney, Agent, or Firm*—WPAT, PC; Justin King

(57) ABSTRACT

The present invention provides a radio interference indicator comprising a controller for processing an instruction and a radio signal receiver coupled to the controller to receive or detect a radio signal. An indicating element is coupled to the controller to indicate the level of the radio signal to allow the user knows the quality of the background the radio signal.

15 Claims, 2 Drawing Sheets

RADIO INTERFERENCE INDICATOR

FIELD OF THE INVENTION

This invention relates to an indicator, and more particularly to a radio interference indicator and the method of processing the same.

BACKGROUND OF THE INVENTION

In recent years, with the progress of the network technology observed mainly as the wide-band of the local area network and the progress of the PC technology by the increasing versatility of computers and the CPU speed, it has become possible to transmit the audio and video data between PCs of a plurality of networks at a high speed to practical use. As requirements for the ability to transfer large amounts of data between computing entities has grown, demand for efficient transfer of the data within and between networks has also increased. The local area networks is typically for local communication such as within a small location, building, while the wide area networks is for communication across a greater distance or even worldwide. Over the past several years various types of networks have allowed network communication between individuals. Therefore, various organizations have created standard techniques to allow communication between host computers on different network. These communication techniques are known as protocols, and are often implemented within each host rather than in the network medium.

Some considerably prolific communication protocols are well known as IEEE 802.11x, blue-tooth or the like. The ubiquitous protocols are used for wireless communication. Further, the protocol also permits packets of information to be sent and received between different types of devices.

One technique for permitting internet communication by wireless involves the use of routers or access points. The router or the access point is connected to two different networks, and which may receive an information packet from a source on one network and communicate it to a destination on the other network. When the router receives the encapsulated packet, it recognizes from the multiple levels of IP information that the packet is ultimately intended for a destination host computer on another network. However, signal interference is raised due to the great amount of wireless devices are introduced in the daily life. Typically, there are two kinds of interference in the air. One is the non-802.11 interference including the microwave oven, Bluetooth device or any other signals which appear in the current working channel. The non-802.11 signal will increase the frame errors (Rx error), and more frame retransmission. In the worst case, if there're continuous collision error (Tx error) signals, the AP will be halted there (always detect energy in the carrier sensing). The other interference is the 802.11 signals from the other APs. The working AP need to share bandwidth with others.

The measured signal to interference ratio (SIR) method is used to determine a data rate which can be supported by the receiver. Typically, higher measured SIR translates into higher data rates, wherein higher data rates involve higher order modulation than lower data rates. One of the data rate determinations is provided in US. Pat. No. 6,930,981. U.S. Pat. No. 6,930,981 disclosed an estimate of frame error rate of received frames. It is determined whether an error correction decoded frame is a good frame.

However, the user is unable to know the quality of the wireless transmission or the parameter of the wireless transmission. What is required is the method and device to provide the aforementioned function.

SUMMARY OF THE INVENTION

It is an object of some aspects of the present invention to provide a method and apparatus for indicating the background radio quality of the current channel.

It is another object of some aspects of the present invention to provide a indicator with indicating means for providing clear and easy way to know the quality of background radio signal, for instance, the collision error, the frame error, the association number, RSSI (receive signal strength indicator), the collision error data rate, the traffic latency or the traffic quality.

The method of indicating a radio interference level includes a step of selecting a parameter and receiving a radio signal associated with the selected parameter, followed by determining the level of the received signal and indicating the level of the radio interference.

The method further comprises at least one of following steps before determining the level of the received signal:
checking whether get the ACK or not;
checking whether frame error pass CRC checking or not;
counting the number of association;
counting the average RSSI;
determining the collision error data rate;
determining the latency for data frames;
determining the number of frames an AP transmitted.

The level of the radio interference signal could be indicated by a visual or audio method. In the visual method, the present invention may indicate the level by the number of flashing LED, the color of flashing LED, or the flashing rate of flashing LED. Alternatively, the level may be indicated by audio method, such as the speaker.

The parameter or radio signal includes collision error, frame error, association number, RSSI (receive signal strength indicator), collision error data rate, traffic latency or traffic quality.

The present also provides a radio interference indicator comprising a controller for processing an instruction or command; a radio signal receiver coupled to the controller to receive or detect a demand radio signal; an indicating element coupled to the controller to indicate the level of the radio signal; and a radio interference level database coupled to the controller to store the level of the radio signal to allow the controller determine the level of the received radio signal.

BRIEF DESCRIPTION OF THE DRAWINGS

The present invention will be more fully understood from the following detailed description of the preferred embodiments thereof, taken together with the drawings, in which.

DETAILED DESCRIPTION OF PREFERRED EMBODIMENTS

Typically, the user is unable to know the quality of the wireless transmission. The interference signal will increase the frame error, and more frame retransmission. One aspect of the present invention is to provide clear and easy method to allow the user to know the status of the certain function or radio parameter in the air so as to allow the user to take further action.

Radio Interference Indicator

Figure 1:
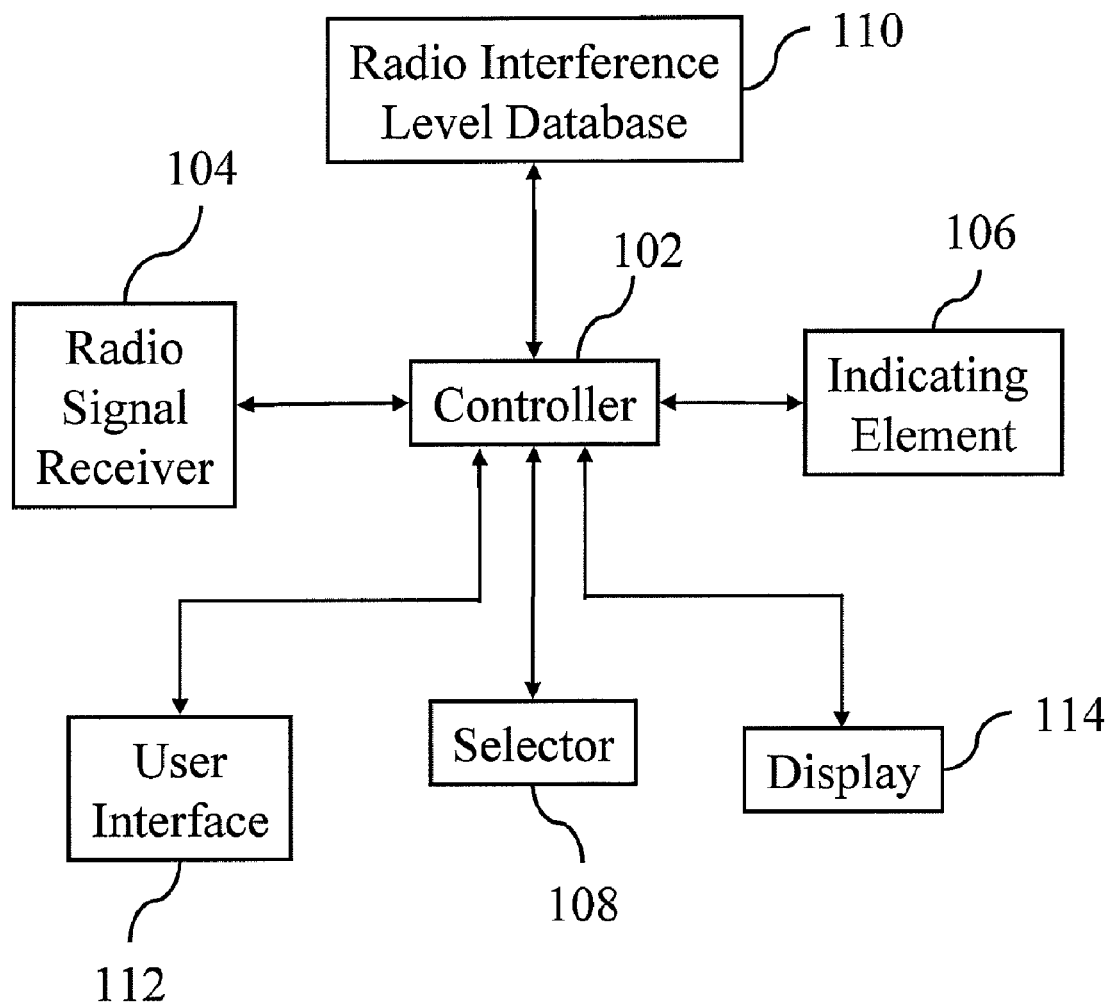
FIG. 1 shows a schematic function diagram illustrating the radio interference indicator according to the present invention.

Reference is now made to FIG. 1, which is a schematic diagram illustrating a system for the radio interference indicator 100. The indicator includes a controller 102 for processing the instruction or command from the input. A radio signal receiver or detector 104 is coupled to the controller 102 to receive or detect the demand radio signal. An indicating element 106 is coupled to the controller 102 to indicate the level of the radio interference. Preferably, the indicating element 106 is visible device such as a plurality of light emitting device to indicate the interference level. The level of interference could be represented by the flashing number of the light emitting device, flashing rate of the light emitting device or color of the light emitting device. In one embodiment, the light emitting device could be LED. Alternatively, it could send the digital signal to the audible device such as speaker for indicating the level of the radio interference. The digital signal has to be converted into analog signal prior to outputting as well known in the art.

A selector 108 is coupled to the controller for the user to select which parameter the user would like to detect. The parameters includes, but not limited to, collision error (Tx error), frame error (Rx error), association number, RSSI (receive signal strength indicator), Tx data rate traffic latency, traffic quality. A user interface 112 is coupled to the controller 102 for the user to input the instruction or command. A display 114 could be also provided and coupled to the controller 102. The message and the information could be displayed on the display 114, as well as the radio interference level. Preferably, the display 114 could be a LCD, for example. A radio interference level database 110 is coupled to the controller 102 to store each type of the radio interference level parameters to allow the controller 102 determine what level of the detected radio signal is. In a preferred embodiment, the radio interference level database 110 includes the parameters or data associated with the collision error (Tx error), frame error (Rx error), association number, RSSI (receive signal strength indicator), Tx data rate traffic latency or traffic quality.

Operation of the Radio Interference Indicator

The Radio Interference Indicator could be a single independent device or be incorporated into another device such as mobile phone, notebook, personal computer, personal digital assistance (PDA) and so on.

Figure 2:
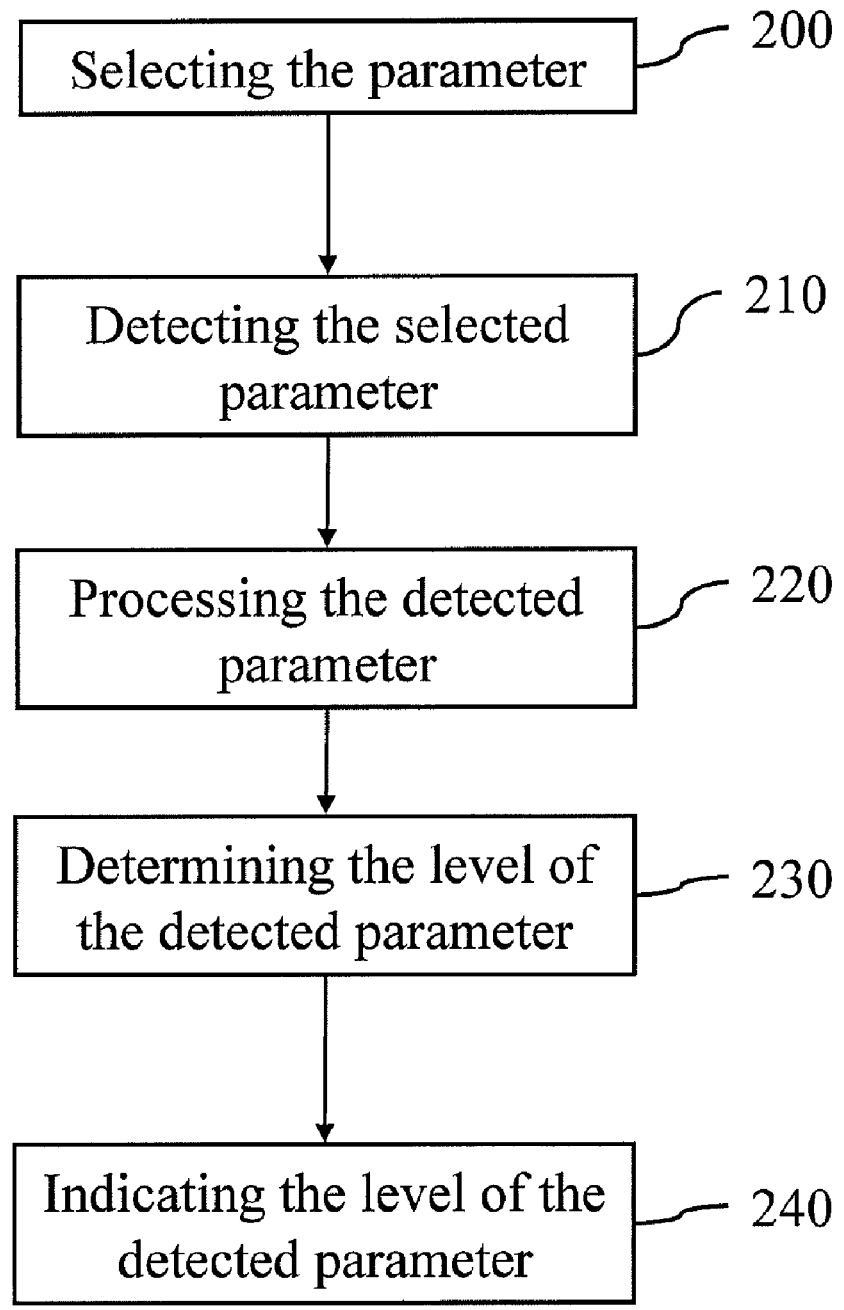
FIG. 2 is a flow chart illustrating the operation of the radio interference indicator according to the present invention.

FIG. 2 is a flow chart illustrating the process flow of the Radio Interference Indicator. Initially, the user may power on the radio interference indicator 100 to receive the radio signal. In step 200, the user may select one of the parameters he would like to know through the selector 108. The selector 108 may be represented and shown on the display 114. The on-screen-display technology or touch panel could be incorporated in the present invention to perform such function. In one embodiment, the display 114 may display items that corresponding to each parameters, for instance, collision error (Tx error), frame error (Rx error), association number, RSSI (receive signal strength indicator), Tx data rate traffic latency, traffic quality. After the selection, the controller 102 will initiate the radio signal receiver or detector 104 to receive or detect certain parameters in step 210. For example, the device may analysis the radio interference according to the radio interference level database 110 that includes the parameters or data of the collision error (Tx error), frame error (Rx error), association number, RSSI (receive signal strength indicator), Tx data rate traffic latency, traffic quality.

(1) Collision Error (Tx Error) and Frame Error (Rx Error)

The present invention may show the collision error and frame error. In one embodiment, when the AP sends out a frame and cannot get the ACK (Acknowledgement), it is defined as the collision in 802.11. If the Rx frame cannot pass the CRC (Cyclic Redundancy Check) checking, it will be defined as Rx error. Therefore, the radio interference level database 110 includes the definition of the collision error and frame error. Thus, in step 220, the controller 102 may process the detected or received signal according to the data stored in the radio interference level database 110. Then, the device may determine the level of the received or detected signal in step 230.

Subsequently, the controller may indicate the level of the radio interference level in step 240. For example, the number of flashing LEDs or flashing rate indicates the MPDU Tx/Rx error level. The error may come from (a) Radio interference, (b) Client in long distance (can not listen to each other), (c) Low RSSI.

(2) Association Indicator

The purpose of the parameter is used to show the number of associated clients on the AP. The method is to count the association. In one embodiment, if there're too many clients in the same area, we can put more AP in the same area, each with lower power for channel reuse. The number can be shown on the display 114, thus the display 114 may act the indicating means under the situation.

(3) RSSI (Receive Signal Strength Indicator)

The indicator according to the present invention may show the signal strength for each Rx frame by counting the average RSSI and show it per certain time period, for example, a second or a few seconds. It could be indicated by the indicating element 106 or be displayed on the display 114.

The RSSI is strongly dependent to the signal quality and Tx rate. If there are clients with low RSSI, it means there're clients to use the AP in long distance with low data rate. The more APs could be arranged for the remote client to improve the bandwidth usage. The associated information may be stored in the radio interference level database 110.

(4) Tx Data Rate Indicator (Reference Design)

The present invention may show the data Tx rate as well. Typically, Tx rate is adapted dynamically. It dependents on the RSSI and Tx/Rx errors. The AP selects the rate to get the maximum throughput (dependent on the Tx rate and error rate). After the detector 104 receives the signal, the controller 102 may determine the level of the received signal or parameter (step 230) according to the data in the radio interference level database 110. The controller 102 instructs the indicating element 106 to show the frame data rate in step 240 for indicating the traffic quality. It can be indicated by the status of the LED.

(5) Traffic Latency Indicator

Another purpose of the present invention is to show the latency for the data frames by counting the frame duration time in the AP. The traffic quality indicator is useful for the real time application, for instance, VOIP.

(6) Traffic Quantity Indicator

The aspect of the present invention is to show the number of frames the AP transmitted by lighting the LED when a certain frame is transmitted. The Indicator may be implemented for the WLAN and LAN LED.

The method or the device with indicating means to indicate the certain quality of the traffic or the like for indicating the interference level. In one embodiment, when the LED is lighted heavily, it means that the user needs to change the AP to a new channel. The method is able to allow the user to know the quality of the wireless transmission. The present invention may provide clear and easy method to know the level of the certain radio signal in the air.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method of indicating a radio interference level, comprising:
    selecting a parameter of a radio, wherein said parameter includes collision error, association number, collision error data rate, traffic quantity or the combination thereof, wherein said collision error data rate is to obtain a maximum throughput and said association number is to show the number of associated clients;
    receiving a radio signal associated with said selected parameter;
    counting the number of association of said radio signal;
    determining the level of said received signal; and
    indicating said level of said radio interference, wherein said level is indicated by a visual method and is indicated by the number of flashing LED, the color of flashing LED, or the flashing rate of flashing LED.

2. The method in claim 1, wherein said level is indicated by audio method.

3. The method in claim 1, further comprising a step of checking whether or not get an ACK (Acknowledgement) before determining said level of said received signal.

4. The method in claim 1, further comprising a step of checking whether received frame passes CRC(Cyclic Redundancy Check) checking or not before determining said level of said received signal.

5. The method in claim 1, further comprising a step of counting the average RSSI before determining said level of said received signal.

6. The method in claim 1, further comprising a step of determining the collision error data rate before determining said level of said received signal.

7. The method in claim 1, further comprising a step of determining the latency for data frames before determining said level of said received signal.

8. The method in claim 1, further comprising a step of determining the number of frames an access point (AP) transmitted before determining said level of said received signal.

9. A radio interference indicator comprising:
    a controller;
    a radio signal receiver coupled to said controller to receive a demand radio signal;
    an indicating element coupled to said controller to indicate the level of said radio signal; and
    a radio interference level database coupled to said controller to store parameters of said radio signal to allow said controller determine the level of said received radio signal.

10. The indicator in claim 9, wherein said indicating element includes a visual device.

11. The indicator in claim 10, wherein said visual device includes LED.

12. The indicator in claim 9, wherein said indicating element includes an audio device.

13. The indicator in claim 12, wherein said audio device includes a speaker.

14. The indicator in claim 9, further comprising a user interface coupled to said controller for input.

15. The indicator in claim 9, further comprising a display coupled to said controller to display information.

* * * * *